US007102569B2

(12) United States Patent
Tan et al.

(10) Patent No.: US 7,102,569 B2
(45) **Date of Patent: *Sep. 5, 2006**

(54) METHOD FOR CALIBRATING SMART ANTENNA ARRAY SYSTEMS IN REAL TIME

(75) Inventors: Zhe Tan, Beijing (CN); Feng Li, Beijing (CN)

(73) Assignee: Da Tang Mobile Communications Equipment Co., Ltd, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 11/166,514

(22) Filed: Jun. 23, 2005

(65) Prior Publication Data

US 2006/0009162 A1 Jan. 12, 2006

Related U.S. Application Data

(63) Continuation of application No. PCT/CN2003/001118, filed on Dec. 25, 2003.

(30) Foreign Application Priority Data

Dec. 25, 2002 (CN) ................................ 02 1 58623

(51) Int. Cl.
*H04B 7/005* (2006.01)
*H04B 17/00* (2006.01)

(52) U.S. Cl. ................ 342/368; 455/67.11; 455/115.1; 455/226.1

(58) Field of Classification Search ..................... None
See application file for complete search history.

(56) References Cited

U.S. PATENT DOCUMENTS 5,546,090 A 8/1996 Roy, III et al.
6,236,839 B1 * 5/2001 Gu et al. ................. 455/67.14
6,339,399 B1 * 1/2002 Andersson et al. ......... 342/372
6,600,445 B1 * 7/2003 Li ............................ 342/368
6,720,919 B1 * 4/2004 Sinsky et al. .............. 342/368
2005/0239506 A1 * 10/2005 Li ............................ 455/561

FOREIGN PATENT DOCUMENTS

CN 1283901 5/2002

OTHER PUBLICATIONS

International Search Report corresponding to International Application No. PCT/CN03/01118 dated Dec. 25, 2003.

* cited by examiner

*Primary Examiner*—Gregory C. Issing
(74) *Attorney, Agent, or Firm*—Alston & Bird LLP

(57) ABSTRACT

Transmitting and receiving compensation coefficients of each antenna element relative to a calibration antenna element are obtained in the pre-calibration of a smart antenna. After the antenna array is installed, in transmitting calibration, amplitude and phase response of each transmitting link is computed according to the calibration signals received by the calibration link and, together with the transmitting compensation coefficient obtained in the pre-calibration, the compensation coefficient of each transmitting link is computed to compensate the downlink data of a base station. In receiving calibration, the amplitude and phase response of each receiving link is computed based on the signals received by the receiving links and, together with the receiving compensation coefficient obtained in pre-calibration, the compensation coefficient of each receiving link is computed to compensate the uplink data of the base station. The calibration signal of each antenna element is generated by a periodic cycling shift of a basic calibration sequence.

13 Claims, 2 Drawing Sheets

METHOD FOR CALIBRATING SMART ANTENNA ARRAY SYSTEMS IN REAL TIME

CROSS-REFERENCE TO RELATED APPLICATIONS

This application is a continuation of PCT/CN2003/001118 filed Dec. 25, 2003, which was published under the Patent Cooperation Treaty in Chinese on Jul. 15, 2004, and which is hereby incorporated herein in its entirety by reference, and this application also claims the benefit of Chinese Patent Application No. 02158623.3, filed Dec. 25, 2002.

FIELD OF THE TECHNOLOGY

The present invention generally relates to smart antenna technology of wireless communication systems, more specifically, to a method for calibrating a smart antenna array system in real time.

BACKGROUND OF THE INVENTION

In modern wireless communication systems, especially in a Code Division Multiple Access (CDMA) wireless communication systems, smart antennas have been one of the most attractive technologies. By means of smart antenna arrays and the technology based on digital signal processing, wireless base stations can achieve self-adaptive beam forming of both transmitting and receiving signals, therefore greatly reducing system interference, increasing system capacity, decreasing the transmitting power and improving the receiving sensitivity.

In the Chinese patent for invention titled, "A Time-Division Duplex Synchronous Code Division Multiple Access Wireless Communication System with Smart Antenna" (CN 97 104039.7), the structure of a wireless communication system base station with a smart antenna is disclosed. The base station comprises an antenna array with one or more than one antenna elements, radio frequency (RF) cables and RF transceivers correspondingly connected. Based on the signals received from the user terminal in each antenna element of the antenna array, a baseband signal processor can obtain the space vector characteristics and direction of arrival (DOA) of the uplink signals, from which the weights of every link obtained are employed for downlink transmitting beam forming. In this way, all the functionality of a smart antenna is achieved under the circumstances of symmetrical radio wave propagation characterized as the result of time-division duplex communication.

In order to transmit and receive signals accurately with the smart antenna, every antenna element, RF cable and transceiver, which comprise the smart antenna must operate without difference, (i.e. every transmitting and receiving link should have the same amplitude and phase response). The procedure and method for amplitude and phase compensation of each transmitting and receiving link comprise the smart antenna calibration relating to the present invention.

As the characteristics of electronic elements, especially active elements, differ from each other, the sensitivities thereof to operation frequency and ambient temperature are different, and the changes in the characteristics of every transmitting and receiving link due to the reasons above are different, the smart antenna calibration of the present invention should generally be carried out periodically while the base station is in operation.

In the published document of the Chinese patent titled, "A Method And Apparatus For Calibrating A Smart Antenna Array" (CN 99 111350.0) (See FIG. 1), a calibrating link is set by an antenna element 201, a couple structure 205, a RF cable 206 and a pilot transceiver 207 sequentially connected. The couple structure 205 sets up a RF couple connection with all the antenna elements 201-1, 201-2 . . . 201-N of the smart antenna, and allocates the RF signals to all antenna elements comprising the array according to need. The pilot transceiver 207 has the same structure as the other transceivers 203-1, 203-2 . . . 203-N of the base station and uses a common local oscillator 208. The pilot transceiver 207 works coherently with other transceivers and connects with the baseband signal processor 204 via a digital bus. Each antenna element connects to a RF cable and further to a transceiver, and the connected antenna element, RF cable and transceiver form a transmitting link or a receiving link. Ac, $A_1$, $A_2$, . . . $A_N$ in FIG. 1 represent the connection points between the antenna elements and the RF cables 201-1, 201-2 . . . 201-N, respectively; $B_C$, $B_1$, $B_2$ . . . $B_N$ represent the connection points of the pilot transceiver 207 and the radio transceivers 203-1, 203-2 . . . 203-N with the baseband signal processor 204, respectively.

When making calibrations, the calibration link is first calibrated by using a network vector analyzer and recording the receiving and transmitting transmission coefficients of the calibration link respectively, then performing the receiving calibration and transmitting calibration respectively. In the receiving calibration, the pilot transceiver transmits a signal at a given working frequency, and all the other links in the base station are set in the receiving state. The outputs of all the receiving links are measured and the ratio of the receiving transmission-coefficient (vector) of each link to the transmission-coefficient (vector) of a reference link is computed. When the ratio of the amplitudes of the transmission-coefficients equals to 1, the phase difference of each receiving link from the reference link is recorded. In the transmitting calibration, set one link after another of the base station in the transmitting state with all the other links closed at the same time as the pilot transceiver receives the signal of each transmitting link at a given working frequency, respectively; the ratio of the transmission-coefficient (vector) of each link during transmission to the transmission-coefficient (vector) of the reference link is computed, and when the ratio of the amplitudes of the transmission-coefficients equals 1, the phase difference of every receiving link from the reference link is recorded.

The patent mentioned above only relates to the general scheme of the method and apparatus for real-time calibration without a specific engineering implementation thereof, including the calibration sequence used in the transmitting and receiving calibration and the computation by the baseband signal processor, and how to perform the real-time calibration when the smart antenna is in operation. In addition, the transmitting calibration as described above is carried out with one link in the transmitting state at a time while all other links are in the receiving state, which is unfavorable for fast real-time calibration.

SUMMARY OF THE INVENTION

Therefore, it is an object of the present invention to provide a real-time calibration method for a smart antenna array and a method for generating the calibration signal so as to periodically calibrate the smart antenna array when a base station is in operation and compute the compensation coefficients for the transmitting and the receiving links of the smart antenna array to be calibrated.

One aspect of the present invention is a method for carrying out real-time calibration for a smart antenna array system. This method comprises a receiving calibration procedure and a transmitting calibration procedure. While in the transmitting calibration, the transmitting links transmit calibration signals simultaneously while a calibration link receives the combined signal thereof. In the receiving calibration, the calibration link transmits a calibration signal while all the receiving links simultaneously receive the signal. A baseband signal processor computes the combined signal received by the calibration link or the signals received by every receiving link respectively and obtains the compensation coefficients of each transmitting link and receiving link of the smart antenna array. Before performing the real-time transmitting and receiving calibration, each antenna element of the smart antenna array is pre-calibrated and the transmitting compensation coefficient $C_k^{TX}$ and receiving compensation coefficient $C_k^{RX}$ of each antenna element relative to the calibration antenna element is obtained. The calibration signal for each antenna element is generated through a periodic cycling shift of a basic calibration sequence, and the calibration signal generated is a calibration sequence with good anti-white-noise characteristics. When performing the transmitting calibration, the baseband signal processor first computes the amplitude and phase response of each transmitting link on the basis of the combined signal received by the calibration link, then on the basis of the amplitude and phase response of each transmitting link and the transmitting compensation coefficients $c_k^{TX}$ obtained in the pre-calibration, the compensation coefficient of each transmitting link for compensating all the downlink data of the base station is computed. And, in the receiving calibration, the baseband signal processor first computes the amplitude and phase response of each receiving link on the basis of the received signals of each receiving link, then computes, on the basis of the amplitude and phase response of each receiving link and the receiving compensation coefficients $c_k^{RX}$ obtained in the pre-calibration, the compensation coefficient of each receiving link for compensating all uplink data of the base station.

In another aspect of the present invention, the pre-calibration before the real-time receiving and transmitting calibration further comprises connecting one end of a network vector analyzer to the calibration antenna element, and connecting the other end of the network vector analyzer to each antenna element one by one. Then, in the transmitting pre-calibration, the $k^{th}$ antenna element transmits a fixed level data signal respectively, which is received by the calibration antenna element so that the transmitting compensation coefficient $c_k^{TX}$ between each antenna element and the calibration antenna element is obtained. And, in the receiving pre-calibration, the calibration antenna element transmits a fixed level data signal, which is received by the $k^{th}$ antenna elements so that the receiving compensation coefficients $c_k^{RX}$ between the calibration antenna element and each antenna element is obtained, k=1, . . . N, and N is the number of antenna elements in the antenna array.

In one aspect of the invention, the pre-calibration is carried out after the production of the smart antenna array. The transmitting and receiving compensation coefficients obtained will be stored. After the smart antenna array is installed on the site of the base station, the stored pre-calibration transmitting and receiving compensation coefficients obtained in the pre-calibration are inputted into the baseband signal processor of the base station.

Another aspect of the invention is where the length of the basic calibration sequence is W×N and the length of the calibration sequence is W×N+W−1, where N is the number of antenna elements in the antenna array, and W is the window length in channel estimation for each transmitting or receiving link.

Another aspect of the present invention is where the transmitting calibration and receiving calibration are periodically performed in the idle gap of the mobile communication system.

In one aspect of the invention involving a TD-SCDMA system, the transmitting calibration and receiving calibration are performed in the protective gap (GP) between the uplink pilot time-slot and the downlink pilot time-slot in a frame.

In another aspect of the invention, computing the compensation coefficient of each transmitting link in the transmitting calibration as described above, further comprises first, obtaining the channel impulse response of each transmitting link; second, computing the amplitude and phase response of the path between each transmitting link, including the transceiver, and the calibration link antenna element; third, multiplying the amplitude and phase response with the transmitting compensation coefficient of the corresponding link obtained in pre-calibration, and then obtaining the transmitting compensation coefficient of each link.

In yet another aspect of the invention, computing the compensation coefficient of each receiving link in the receiving calibration as described above, further comprises first, obtaining the channel impulse response of each receiving link; second, computing the amplitude and phase response of the path between each receiving link, including the calibration link antenna element, and the transceiver; third, multiplying the amplitude and phase response with the receiving compensation coefficient of the corresponding link obtained in the pre-calibration, and then obtaining the receiving compensation coefficient of each link.

Another aspect of the present invention includes a method for generating calibration signals for real-time calibration of a smart antenna array. The method comprises generating the calibration signal by making a periodic cycling shift to a basic calibration sequence, which further comprises: taking a binary sequence $m_p$ as the basic calibration sequence with a length P; performing a phase equalization to the sequence $m_p$ to generate $\underline{m}_p$, a complex vector for the calibration sequence; expanding the $\underline{m}_p$ periodically to obtain $\underline{m}$, new periodical complex vector; obtaining a calibration vector for each antenna element from the $\underline{m}$; generating a calibration signal for each antenna element from the calibration vector for each antenna element.

Another aspect of this invention is a real-time calibration method, for which it is necessary to set a calibration link especially for realizing the calibration function (as described in the background of the invention), which calibration link is comprised of an antenna element, a feeder cable and a pilot transceiver. The method comprising first pre-calibrating the antenna array to obtain compensation coefficients of each antenna element relative to a calibration antenna element before the delivery of the antenna array. Then storing the compensation coefficients in the network operation and maintenance equipment and loading the compensation coefficient into the base station after the on-site installation of the smart antenna array.

As described above, In one aspect, the calibration is performed periodically while the base station is in operation. This aspect further comprises the transmitting links simultaneously transmitting a fixed level calibration sequence, which is received by the calibration link as a combined signal thereof during the transmitting calibration, In the receiving calibration, the calibration link transmitting a fixed level calibration sequence, which is received simultaneously by the receiving links.

In another aspect of the invention, by computing the received signals according to the computation method provided by this invention, the compensation coefficients of the transmitting and receiving links of the smart antenna array can be obtained so that the real-time calibration can be accomplished.

In yet another aspect of the invention, the fixed level calibration sequence employed is generated by a periodic cycling shift to a basic calibration sequence.

The method of the present invention has many advantages including one of short computation time and simple controls. It is especially suitable for a smart antenna array in the third generation mobile communication system with high chip rate, though it may be used in other applications.

Although the above solution is proposed generally for CDMA wireless communication systems, embodiments of the method of the present invention are fully applicable to frequency division multiple access and time division multiple access wireless communication systems after obvious modifications. The embodiments of the present invention can not only be used to calibrate a smart antenna operating in TDD mode, but also a smart antenna operating in FDD mode.

By calibrating a smart antenna array with the method of the present invention, beams of the smart antenna array are greatly improved and the transmitting powers are decreased, resulting in a good implementation of the smart antenna technology.

These and other aspects of the present invention are more fully described herein.

BRIEF DESCRIPTION OF THE DRAWINGS

Figure 1:
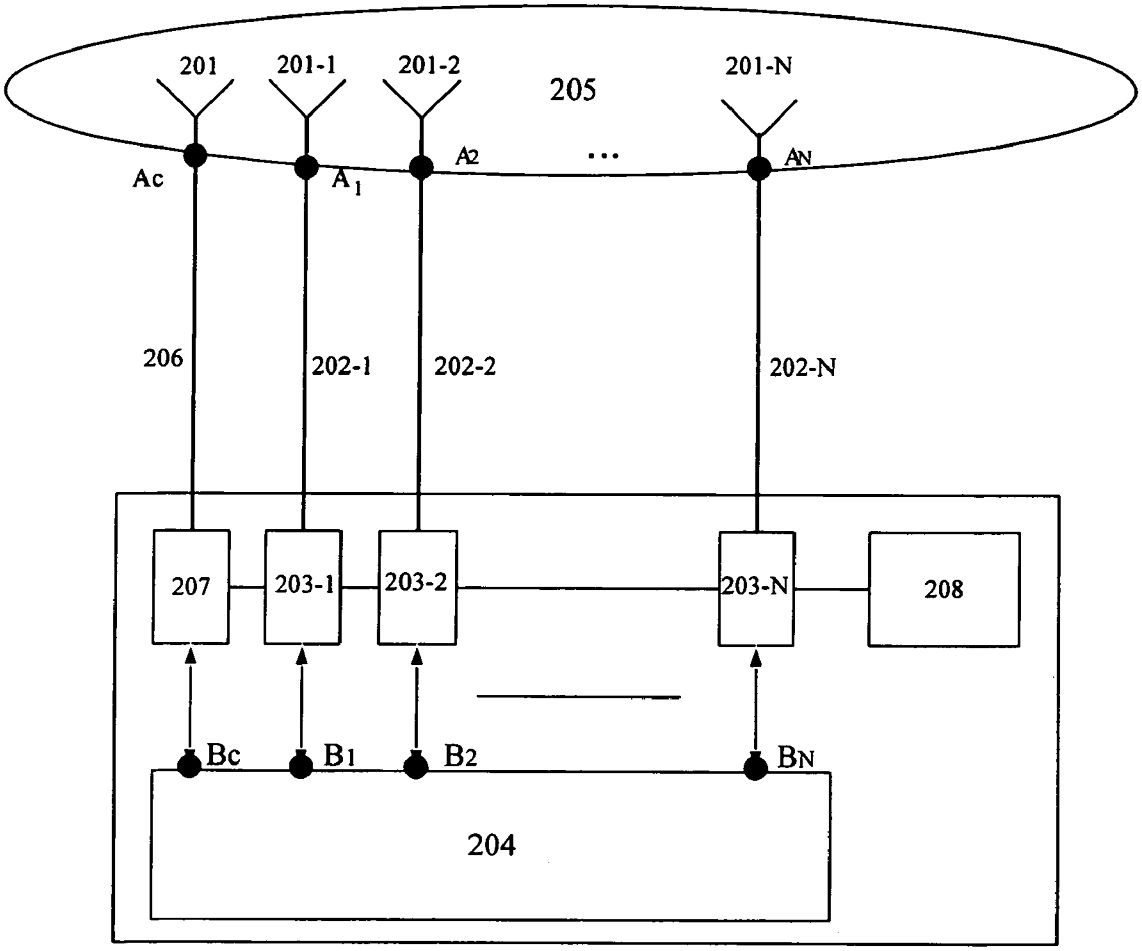
Figure 2:
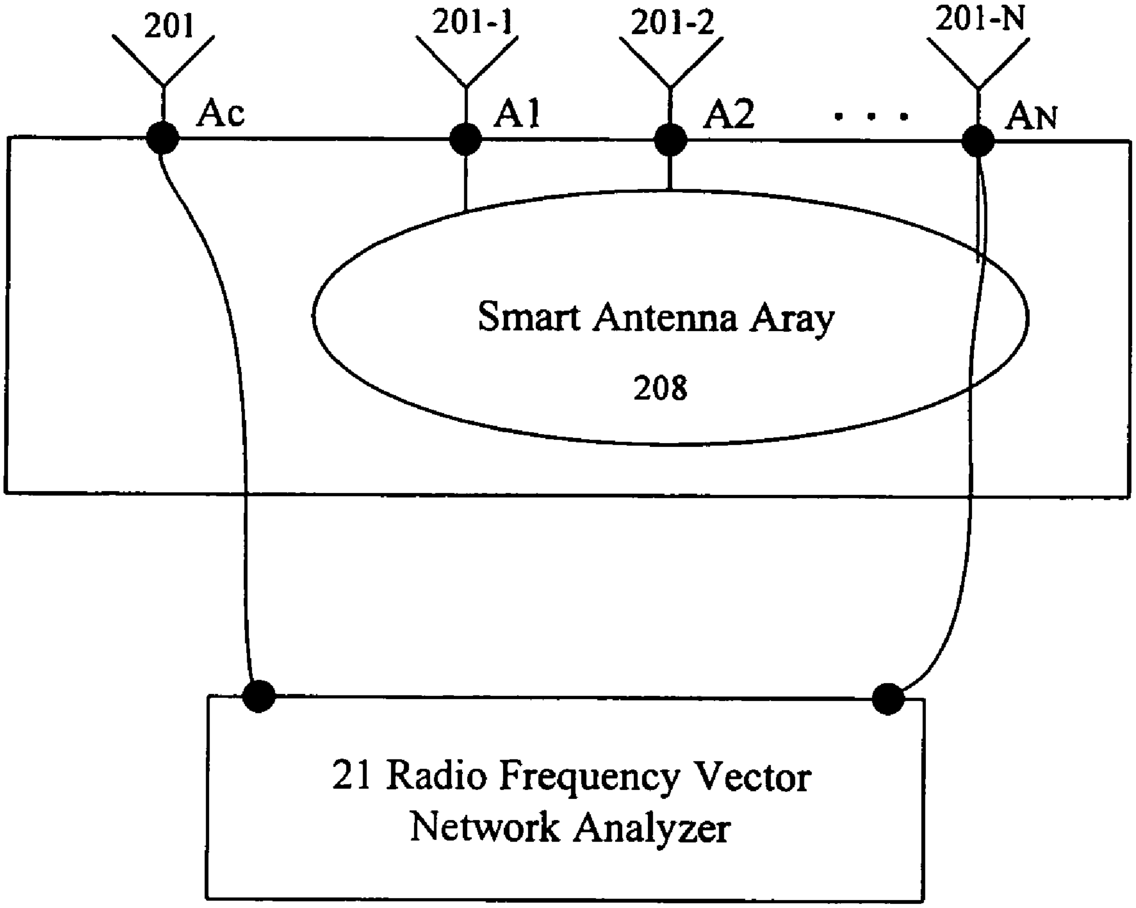

Having thus described the invention in general terms, reference will now be made to the accompanying drawings, which are not necessarily drawn to scale, and wherein:

FIG. 1 is a schematic diagram for the configuration of a base station with a smart antenna array comprising a calibration link; and FIG. 2 is a schematic diagram for the layout of pre-calibration of a smart antenna array.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

The method of the present invention is proposed on the basis of an antenna array which is a passive microwave (radio frequency) network. Characteristics of mutual coupling between each antenna element of this antenna array and the calibration antenna element remain unchanged at a given working frequency provided that the design of the antenna array product has been finalized and the structure thereof is fixed. Therefore, before delivery of the antenna array, each antenna element of the antenna array can be tested relative to the calibration antenna element at a given working frequency or can be pre-calibrated to obtain the compensation coefficient of each antenna element relative to the calibration antenna element which is then stored in the network management database as the pre-calibration data. After the antenna array has been installed on-site, the antenna array pre-calibration data are loaded to the base station by the network operation and maintenance equipment, such as OMC_R (operation and maintenance center—radio part) or LMT (local maintenance terminal). In this way, the antenna array can be calibrated with the real-time calibration method according to the present invention when the antenna array starts into operation.

The embodiments of the method of the invention can be employed in a typical time-division duplex (TDD) CDMA base station equipped with a smart antenna. The configuration of a base station that may be used in an embodiment of the invention is shown in FIG. 1. The base station comprises N identical antenna elements 201-1, 201-2 . . . 201-N; N identical feeder cables 202-1, 202-2 . . . 202-N; N RF transceivers 203-1, 203-2 . . . 203-N that work coherently; and an appropriate baseband signal processor 204. In order to implement the calibration, a calibration (reference) link is also established, which is comprised of a RF coupling structure 205, a calibration antenna element 201, a feeder cable 206 and a pilot transceiver 207, wherein the pilot transceiver 207 works coherently with N transceivers 203-1, 203-2 . . . 203-N, and uses a common local oscillator 208. N transceivers 203-1, 203-2 . . . 203-N and the pilot transceiver 207 connect with the baseband signal processor 204 via a data bus.

The real-time calibration method of an embodiment of the present invention comprises the following key steps:

The First step: before delivery of the smart antenna array, pre-calibrating each antenna element using a radio frequency (microwave) network vector analyzer to obtain the compensation coefficient for each antenna element relative to the calibration antenna element.

Referring to FIG. 2, during pre-calibration, with one end of the radio frequency network vector analyzer 21 connected to the antenna element of the calibration link 201 through the point Ac and the other end connected to the antenna elements 201-1, 201-2 . . . 201-N of the smart antenna array 208 in proper order through the points $A_1, A_2 \ldots A_N$, the radio frequency network vector analyzer 21 performs the transmitting and receiving pre-calibration, respectively.

If the structure of the smart antenna is rather firm by design, it is to be recognized that the channel characteristics between each antenna element 201-1, 201-2 . . . 201-N and the calibration antenna unit 201 remain unchanged on the whole with the environmental conditions at a fixed working frequency, given that there is no disruption of the relative location. So it is possible to perform the pre-calibration measurement using a radio frequency network vector analyzer.

In the transmitting pre-calibration, a fixed level digital signal is transmitted by each antenna element of 201-1, 201-2 . . . 201-N, respectively, and the signal is received by the antenna element of the calibration link 201; the radio frequency network vector analyzer 21 measures and computes the transmitting compensation coefficient $c_i^{TX}$ (TX represents transmitting) between $A_i$ (i=1, . . . N ) and $A_c$, thus the transmitting compensation coefficient $c_i^{TX}$ between each antenna element of 201-1, 201-2 . . . 201-N and the calibration antenna element 201 is obtained. In the receiving pre-calibration, the said antenna element of the calibration link 201 transmits a fixed level digital signal, which is received by each antenna element 201-1, 201-2 . . . 201-N; the radio frequency network vector analyzer 21 measures and computes the receiving compensation coefficient $c_i^{RX}$ (RX represents receiving) between $A_c$ and $A_i$ (i=1, . . . N), thus the receiving compensation coefficient $c_i^{RX}$ between the calibration antenna element 201 and each antenna element 201-1, 201-2 . . . 201-N is obtained.

In general, in a base station of a TDD CDMA system, since each transceiver is connected to the same antenna element (i.e. the transmitting and receiving links have a common antenna element), the measured transmitting compensation coefficient of each antenna element equals to the receiving compensation coefficient thereof, i.e. $c_i^{TX}=c_i^{RX}$.

In an FDD CDMA system, however, when smart antenna technology is employed, different antenna arrays are usually used for transmitting and receiving, respectively, in order to isolate the transmitting link from the receiving link. Therefore, each antenna element of the two antenna arrays should be measured and pre-calibrated, respectively.

The Second step: inputting the above pre-calibration result (the transmitting compensation coefficient and the receiving compensation coefficient) in the network operation and maintenance equipment. After the antenna array has been installed on site, the antenna array compensation coefficients are loaded to the baseband signal processor of the base station to which the antenna array is connected by the network operation and maintenance equipment, such as OMC_R or LMT.

The Third step is carried out while the base station starts operation or is in operation. This step comprises: generating a calibration sequence; performing the transmitting calibration; performing the receiving calibration; and computing the transmitting and receiving compensation coefficients.

The calibration sequence is generated by a periodic cycling shift of a basic calibration sequence selected with good anti-white-noise characteristics. The length of the basic calibration sequence P is W×N, where N is the number of operating antenna elements of the antenna array, and W is the window length in the channel estimation of each link. The length of the calibration sequence when performing the transmitting and receiving calibration is W×N+W−1, that is, P+W−1.

Since W relates only to the inconsistency of the hardware time-delay of each antenna element (usually very small), the calibration duration is very short when carrying out calibration by using the method of the present invention. In some systems where the calibration duration is limited, N can take a larger value in order to have a larger antenna gain for the system.

The procedure for generating the calibration sequence from the basic calibration sequence is as follows:

(1) Take a binary sequence $m_P$ with the length of P as the basic calibration sequence, where $m_P=(m_1,m_2, \ldots ,m_P)$, P=W×N (select a power of 2 as P to simplify the computation);

(2) In order to avoid an abrupt phase change and increase the calibration accuracy, make a phase equalization of the basic calibration sequence $m_P$ to generate a complex vector of the calibration sequence $\underline{m}_P$; $\underline{m}_P=(\underline{m}_1,\underline{m}_2, \ldots ,\underline{m}_P)$, where the element $\underline{m}_i$ is derived from the corresponding element $m_i$ of the sequence $m_P$, $\underline{m}_i=(j)^{i-1}\cdot m_i$, (i=1 . . . P), and j is the square root of (−1), in this way the phase equalization is implemented;

(3) In order to generate the calibration sequence for each antenna element, the basic calibration sequence is periodically expanded to obtain a new complex vector $\underline{m}$,$\underline{m}=(\underline{m}_1, \underline{m}_2, \ldots ,\underline{m}_{i_{max}})=(\underline{m}_2, \underline{m}_3, \ldots ,\underline{m}_P,\underline{m}_1,\underline{m}_2, \ldots ,\underline{m}_P)$;

(4) The calibration sequence vector of each antenna element can be obtained from this periodical complex vector, and a fixed level calibration signal is thereby generated:

the sequence vector $\underline{m}^{(k)}=(\underline{m}_1^{(k)},\underline{m}_2^{(k)}, \ldots ,\underline{m}_{L_m}^{(k)})$, k=1 . . . N, Lm=P+W−1 (Lm is the window length, i.e. the length of the transmitting calibration sequence).

An element of the sequence vector $\underline{m}_i^{(k)}=\underline{m}_{i+(N-k)W}$, i=1, . . . , $L_m$ and k=1, . . . , N (k represents any antenna element of an operating antenna array).

At the same time, a vector S relating to the basic calibration sequence should be computed for this invention as well, which is stored in the baseband signal processor as a constant vector for computing the compensation coefficients when performing the transmitting and receiving calibrations:

$$S=1./fft(\underline{m}_P)=1./fft(\underline{m}_1,\underline{m}_2, \ldots ,\underline{m}_P)$$

where ./ represents a point-division and fft represents the Fast Fourier Transform Algorithm.

The step of selecting the basic calibration sequence refers to selecting a binary sequence which makes S have a minimum norm and has a length P.

The transmitting calibration comprises the following steps: each antenna element transmitting a fixed level calibration sequence simultaneously, and the calibration link receiving the combined signal thereof. With the algorithm provided by the present invention, the baseband signal processor processing the signal data received by the calibration link, computing the amplitude and phase response of each transmitting link, and then computing the compensation coefficient (including the amplitude and the phase compensation) for each transmitting link according to the compensation coefficient (transmitting compensation coefficient) thereof obtained during pre-calibration, by which all the downlink data of the base station are compensated at the baseband signal processor.

Taking the base station in FIG. 1 as an example, N transmitting links transmit calibration sequence vectors $\underline{m}^{(k)}$ with a certain power level at point $B_k$ (k=1, . . . N). Through the transceivers 203-1 . . . 203-N, the feeder cables 202-1 . . . 202-N, the antenna elements 201-1 . . . 201-N and the antenna array couple structure 205, the fixed level signals are received by the calibration link antenna element 201. The baseband signal processor computes the received data from the calibration link (201, 206 and 207) to obtain the amplitude and phase response of each transmitting link $B_k \rightarrow A_k$. In fact, the amplitude and phase response of the link $B_k \rightarrow A_k \rightarrow A_C \rightarrow B_C$ is needed. Since the amplitude and phase response of the path $A_k \rightarrow A_C$ has been obtained in the pre-calibration, only the amplitude and phase response of the path $B_k \rightarrow A_k$ needs to be computed.

Suppose R is the complex vector received from the baseband signal processor after each transmitting calibration sequence signal of the antenna elements 201-1 . . . 201-N is accumulated in the calibration link antenna unit 201, the receiving sequence:

$$R=(r_1, r_2, \ldots , r_1)1=p+2\times(w-1),$$

from which a section can be intercepted with a length equaling to that of the basic sequence P, that is, $\underline{R}_p=(\underline{r}_1,\underline{r}_2, \ldots ,\underline{r}_p)$. Suppose the interception is made in the middle of the sequence (there could be various ways of interception) as represented in the following formula, $\underline{R}_p=(r_{w-1},r_w, \ldots ,r_{w+p-2})$ A Channel Impulse Response (CIR) sequence with a length of P can be obtained by operation of the following formula: $CIR=(c_1,c_2, \ldots ,c_p)=ifft(fft(\underline{R}_P \cdot S))$, where · represents a point multiplication, fft represents the Fast Fourier Transform Algorithm, ifft represents the Inverse Fast Fourier Transform Algorithm, S is the constant vector obtained as described above.

$$\text{Compute } CIR_k = f\max(c_{w\times(k-1)+1}, \ldots, c_{w\times k}), k=1, \ldots N,$$

f max is an interpolation function to evaluate the peak between the channel estimation results $c_{w\times(k-1)+1} \sim c_{w\times k}$ of the $k^{th}$ transmitting link (the specific value depends on the required computation accuracy), $CIR_k$ is a complex number comprising the amplitude and phase response of the path $B_k \rightarrow A_c$ of the $k^{th}$ link.

Multiply the $CIR_k$ with the transmitting compensation coefficient $C_k^{TX}$ of the path $A_k \rightarrow A_C$ of the $k^{th}$ link obtained in the pre-calibration, then obtain:

$$CIR'_k = CIR_k \times c_k^{TX}, k=1 \ldots N,$$

where, $CIR'_k$ is also a complex number, which contains the amplitude and phase response of the path $B_k \rightarrow A_k$ of the $k^{th}$ link. By using the said amplitude and phase response above, the transmitting compensation coefficient of the $k^{th}$ link can be obtained.

The receiving calibration comprises the following steps: the calibration link transmitting a fixed level calibration sequence signal, which is received by each receiving link simultaneously. The baseband signal processor computing the amplitude and phase response of each receiving link on the basis of the received data at each receiving link, by which and the receiving compensation coefficient obtained in the pre-calibration the compensation coefficient (including the amplitude and phase compensation) of each receiving link is computed and obtained. With the compensation coefficients, all downlink data of the base station can be compensated in the baseband signal processor.

Also taking the base station in FIG. 1 as an example, the calibration link (201, 206 and 207) transmits a calibration vector signal with a certain power level $\underline{m}^{(k)}$ (k=1, . . . N) at point $B_c$. The signal is received by each receiving link through the couple structure 205, each antenna element of the antenna array 201-1 . . . 201-N each feeder cable 202-1, . . . 202-N, each transceiver 203-1, . . . 203-N. The baseband signal processor 204 computes the data received from each receiving link to obtain the amplitude and phase response of each receiving link ($A_k \rightarrow B_k$). In fact, the amplitude and phase response of the path $B_c \rightarrow A_c \rightarrow A_k \rightarrow B_k$ is needed, since the amplitude and phase response of the path $A_c \rightarrow A_k$ have been obtained in pre-calibration, only the amplitude and phase response of the path $A_k \rightarrow B_k$ needs to be computed.

Suppose $R^k$ is the complex vector of each link received in the baseband signal processor 204, the receiving sequence:

$$R^k=(r_1^k, r_2^k, \ldots, r_1^k), 1=p+2\times(w-1), k=1, \ldots N.$$

Intercept a section from the receiving sequence with a length that equals to the length of the basic calibration sequence P, $\underline{R}_P^k=(\underline{r}_1^k, \underline{r}_2^k, \ldots, \underline{r}_p^k$. Suppose the interception is made in the middle of the sequence (there could be various ways of interception) as represented in the following formula, $\underline{R}^k_p=(r_{w-1}^k, r_w^k, \ldots, r_{w+p-2}^k)$ k=1, . . . , N.

A Channel Impulse Response (CIR) sequence with the length of P can be obtained by operation of the following formula: $CIR^k=(c_1^k, c_2^k, \ldots, c_p^k)=ifft(fft(\underline{R}_p^k \cdot S))$ , k=1, . . . N, where ·represents a point multiplication, fft represents the Fast Fourier Transform Algorithm, ifft represents the Inverse Fast Fourier Transform Algorithm, and S is the constant vector obtained as described above.

Compute $CIR_k = f\max(c_1^k, c_2^k \ldots, c_p^k)$, k=1, . . . N, f max is an interpolation function to evaluate the peak between the channel estimation results $c_1^k \sim c_{work}^k$ of the $k^{th}$ receiving link (the specific value depends on the required computation accuracy), $CIR_k$ is a complex number containing the amplitude and phase response of the path $B_k \rightarrow A_c$ of the $k^{th}$ link.

Multiply the $CIR_k$ with the receiving compensation coefficient $c_k^{RX}$ of the path $Ac \rightarrow A_k$ of the $k^{th}$ link obtained in the pre-calibration, and obtain:

$$CIR'_k = CIR_k \times c_k^{RX}, k=1, \ldots N,$$

where $CIR'_k$ is also a complex number, containing the amplitude and phase response of the path $A_k \rightarrow B_k$ of the $k^{th}$ link, by means of which the receiving compensation coefficient of the $k^{th}$ link can be obtained.

The formulas adopted in this invention for computing the compensation coefficient are as follows:

First, compute the mean power of each link, which is carried out for the transmitting link and receiving link respectively, that is, $CIR_k'$ in the following formula is the result of the transmitting calibration and the receiving calibration, respectively.

$$\text{Mean\_power} = \left(\sum_{k=1}^{N} (\text{abs}(CIR'_k))^2\right) \Big/ N,$$

(abs is an amplitude function).

In this way, the transmitting compensation coefficient and the receiving compensation coefficient can be computed respectively by the following formula. While computing the compensation power of the receiving link, use the mean power of the receiving link and the $CIR_k'$ obtained in the receiving calibration, and while computing the compensation power of transmitting link, use the mean power of the transmitting link and the $CIR_k'$ obtained in the transmitting calibration:

$$\text{Corr\_factor}^k = sqrt(\text{Mean\_power})/CIR'_k, k=1, \ldots N.$$

Although the descriptions above are given with reference to the structure of a TDD CDMA base station, the calibration method is independent of the transmitting calibration and the receiving calibration, so the method of the present invention can also be implemented in an FDD CDMA base station which uses different smart antenna arrays to transmit and receive signals.

In the present invention, data transmitted and received are compensated respectively by the baseband signal processor using the transmitting compensation coefficient and the receiving compensation coefficient computed. Thus a software implementation of real-time calibration of a smart antenna array is achieved.

In practice, it is not likely for a mobile communication system to run in full load all the time. There would always be some idle gaps which can be used for real-time calibration. For TD-SCDMA system, a third generation mobile communication system, the Gap Period (GP) between the Uplink Pilot Time-Slot (UpPTS) and the Downlink Pilot Time-Slot (DwPTS) in a frame can be used for the real-time calibration.

The calibration by this method can be periodically performed while the base station is in operation.

Any person skilled in the art of smart antenna calibration with an understanding of the basic principles thereof can easily implement the real-time calibration of a smart antenna array by referring to the method of this invention.

Many modifications and other embodiments of the invention will come to mind to one skilled in the art to which this invention pertains having the benefit of the teachings presented in the foregoing descriptions. Accordingly, it should be understood that the invention is not to be limited to the specific embodiments disclosed and that modifications and other embodiments are intended to be included within the scope of the appended exemplary inventive concepts. Although specific terms are employed herein, they are used in a generic and descriptive sense only and not for purposes of limitation.

That which is claimed:

1. A method for calibrating smart antenna array systems in real time, comprising:

pre-calibrating each antenna element of a smart antenna array to obtain a transmitting compensation coefficient $c_k^{TX}$ and a receiving compensation coefficient $c_k^{RX}$ of each antenna element relative to a calibration antenna element;

performing a transmitting calibration procedure comprised of transmitting calibration signals simultaneously over a plurality of transmitting links to form a combined signal such that a calibration link receives the combined signal;

performing a receiving calibration procedure comprised of transmitting a receiving calibration signal over the calibration link such that a plurality of receiving links receive the receiving calibration signal simultaneously; and processing the combined signal received by the calibration link and the receiving calibration signal received by the receiving links, respectively, with a baseband signal processor to obtain compensation coefficients of each transmitting link and each receiving link of the smart antenna array, wherein:

A. the transmitting and receiving calibration signal for each antenna element is generated by a periodic cycling shift of a basic calibration sequence such that each calibration signal is a calibration sequence with good anti-white-noise characteristics;

B. in the transmitting calibration procedure, the baseband signal processor first computing an amplitude and phase response of each transmitting link on the basis of the combined signal received by the calibration link, then computing the compensation coefficient of each transmitting link on the basis of the amplitude and phase response of each transmitting link and the transmitting compensation coefficients $c^{kTX}$ obtained in the pre-calibration for compensating downlink data of the base station; and C. in the receiving calibration procedure, the baseband signal processor first computing an amplitude and phase response of each receiving link on the basis of the received receiving calibration signal of each receiving link, then computing the compensation coefficient of each receiving link on the basis of the amplitude and phase response of each receiving link and the receiving compensation coefficients $C_k^{RX}$ obtained in the pre-calibration for compensating uplink data of the base station.

2. The method according to claim 1, wherein said pre-calibrating each antenna element of a smart antenna array to obtain a transmitting compensation coefficient $c_k^{TX}$ and a receiving compensation coefficient $C_k^{RX}$ of each antenna element relative to a calibration antenna element comprises:

connecting one end of a network vector analyzer to the calibration antenna element and the other end of the network vector analyzer to each antenna element one by one;

in the transmitting pre-calibration, the $k^{th}$ antenna element transmitting a fixed level data signal sequentially, the calibration antenna element receiving the signal, then obtaining the transmitting compensation coefficient $C^{kTX}$ between each antenna element and the calibration antenna element; and in the receiving pre-calibration, the calibration antenna element transmitting a fixed level data signal, the $k^{th}$ antenna elements receiving the signal, then obtaining the receiving compensation coefficients $C_k^{RX}$ between the calibration antenna element and each antenna element, wherein k=1, . . . N, and N is the number of the antenna elements in the antenna array.

3. The method according to claim 1, wherein generating the transmitting and receiving calibration signal for each antenna element by a periodic cycling shift of a basic calibration sequence further comprises:

taking a binary sequence $m_p$ with a length P as the basic calibration sequence;

performing a phase equalization to the sequence $m_p$ to generate a complex vector of calibration sequence $\underline{m}_p$;

expanding the $\underline{m}_p$ periodically to obtain a new periodical complex vector $\underline{m}$;

obtaining a calibration vector for each antenna element from the $\underline{m}$;

generating said transmitting and receiving calibration signal for each antenna element from the calibration vector for each antenna element.

4. The method according to claim 3, wherein said P is selected as a power of 2.

5. The method according to claim 1, wherein said transmitting calibration procedure and receiving calibration procedure, in steps B and C, are periodically performed in the idle gap of a mobile communication system.

6. The method according to claim 1, wherein, in a TD-SCDMA system, said transmitting calibration procedure and receiving calibration procedure, in steps B and C, are periodically performed in the guard period between an uplink pilot time-slot and a downlink pilot time-slot in a frame.

7. The method according to claim 1, wherein computing the compensation coefficient of each transmitting link in the transmitting calibration procedure in said step B further comprises:

b1. obtaining a complex vector of the combined signal received by the calibration link $R=(r_1, r_2, \ldots, r_l)$, where $l=P+2\times(w-1)$, $P=w\times N$ represents the length of said basic calibration sequence, N is the number of antenna elements of the smart antenna array, and w is a window length in a channel estimation of each transmitting link;

b2. intercepting from the complex vector a section $\underline{R}_p=(\underline{r}_1,\underline{r}_2, \ldots, \underline{r}_p)$ with a length equal to that of the basic calibration sequence P;

b3. computing a Channel Impulse Response sequence with a length P using the formula $CIR=(c_1,c_2, \ldots ,c_p)=ifft(fft(\underline{R}_p \cdot S))$, where S is a constant vector; computing a Channel Impulse Response sequence with a length P using the formula $CIR^k=(c_1^k, c_2^k, \ldots ,c_p^k)=ifft(fft(\underline{R}_p^k \cdot S))$, where k=1 . . . N, and S is a constant vector;

b4. computing an interpolation function of a peak value between the channel estimation results $c_{w\times(k-1)+1}\sim c_{w\times k}$ of a $k^{th}$ transmitting link: $CIR_k$=f max ($c_{w\times(k-1)+1}, \ldots, c_{w\times k}$), and obtaining the amplitude and phase response of the $k^{th}$ link including a path between a transmitter and the antenna element of the calibration link, k=1, . . . N;

b5. multiplying $CIR_k$ with the transmitting compensation coefficient $C_k^{TX}$ of the $k^{th}$ link obtained in the pre-calibration, obtaining the amplitude and phase response of the $k^{th}$ link including the path between the transmitter and the antenna element thereof:

$$CIR'_k=CIR_k\times c_k^{TX}, k=1 \ldots N;$$

b6. computing the mean power of a transmitting link with the following formula:

$$\text{Mean\_power}=\left(\sum_{k=1}^{N}(\text{abs}(CIR'_k))^2\right)\Big/N;$$

and b7. computing the transmitting compensation coefficient of each transmitting link with the following formula: Corr_factor$^k$=sqrt(Mean_power)/CIR'$_k$, where sqrt ( ) represents a square root function.

8. The method according to claim 7, wherein said Step b2 is performed by intercepting a part of the basic calibration sequence as expressed by the following formula $\underline{R}_p=(r_{w-1}, r_w, \ldots, r_{w+p-2})$.

9. The method according to claim 7, wherein the constant vector S in Step b3 is computed by the formula: $S=1\cdot/\text{fft}(\underline{m}_P)=1\cdot/\text{fft}(\underline{m}_1,\underline{m}_2, \ldots, \underline{m}_p)$, where the complex vector of the calibration sequence, $\underline{m}_P=(\underline{m}_1,\underline{m}_2, \ldots, \underline{m}_P)$, is generated by a phase equalization to the basic calibration sequence $m_P=(m_1,m_2, \ldots, m_P)$, the element of the sequence $\underline{m}_i=(j)^{i-1}\cdot m_i$, i=1, . . . P, P=w×N represents the length of said basic calibration sequence, N is the number of antenna elements of the smart antenna array, and w is the window length in channel estimation of each transmitting link.

10. The method according to claim 1, wherein computing the compensation coefficient of each receiving link in the receiving calibration in said step C, further comprises:

c1. obtaining a complex vector sequence of the signal received by each receiving link $R^k=(r_1^k, r_2^k, \ldots, r_l^k)$, where l=P+2×(w−1), k=1, . . . N, P=w×N represents the length of the basic calibration sequence, N is the number of antenna elements of the smart antenna array, and w is the window length of channel estimation of each receiving link;

c2. intercepting from the basic calibration sequence a section with a length equals to that of the basic calibration sequence P, $\underline{R}_P^k=(\underline{r}_1^k,\underline{r}_2^k, \ldots, \underline{r}_p^k)$ k=1, . . . N;

c3. obtaining a Channel Impulse Response sequence with a length P by the formula $CIR^k=(c_1^k,c_2^k, \ldots, c_p^k)$=ifft (fft($\underline{R}_p^k\cdot S$)), where k=1, . . . N and S is a constant vector;

c4. computing an interpolation function of a peak value between the channel estimation results $c_1^k\sim c_{w\times k}^k$ of a $k^{th}$ receiving link with $CIR_k$=f max($c_1^k,c_2^k \ldots, c_p^k$), obtaining an amplitude and phase response of the $k^{th}$ receiving link including a path between an antenna element of the calibration link and an RF receiver, k=1, . . . N;

c5. multiplying $CIR_k$ with the receiving compensation coefficient $c_k^{RX}$ of the $k^{th}$ link obtained in the pre-calibration, obtaining the amplitude and phase response of the $k^{th}$ receiving link including the path between the antenna element and the RF receiver, $CIR'_k=CIR_k\times c_k^{RX}$ k=1, . . . N;

c6. computing the mean power of a receiving link with the formula:

$$\text{Mean\_power}=\left(\sum_{k=1}^{N}(\text{abs}(CIR'_k))^2\right)\Big/N;$$

and c7. computing a receiving compensation coefficient of each receiving link with the formula: Corr_factor$^k$=sqrt (Mean_power)/CIR'$_k$, where k=1, . . . N and sqrt( ) represents a square root function.

11. The method according to claim 10, wherein said step c2 is performed by intercepting a part of the basic calibration sequence as expressed by the formula $\underline{R}^k_p=(r_{w-1}^k, r_w^k, \ldots, r_{w+p-2}^k)$, k=1, . . . N.

12. The method according to claim 10, wherein said constant vector S in said step c3 is computed with the formula: $S=1\cdot/\text{fft}(\underline{m}_P)=1\cdot/\text{fft}(\underline{m}_1,\underline{mm}_2, \ldots, \underline{m}_p)$, where the complex vector of the calibration sequence $\underline{m}_P=(\underline{m}_1,\underline{m}_2, \ldots, \underline{m}_P)$ is generated by a phase equalization to the basic calibration sequence $m_P=(m_1,m_2, \ldots, m_P)$, the element of the sequence $\underline{m}_i=(j)^{i-1}\cdot m_i$, i=1, . . . P, P=w×N represents the length of the basic calibration sequence, N is the number of the antenna elements of the smart antenna array, and w is the window length of channel estimation of each receiving link.

13. A method for generating a calibration sequence signal for the real-time calibration of a smart antenna array by a periodic cycling shift of a basic calibration sequence, comprising the steps of:

a1. providing a binary sequence $m_p$ with the length P as the basic calibration sequence, $m_P=(m_1, m_2, \ldots, m_P)$, where P=w×N, N is the number of antenna elements of a smart antenna array, and w is the window length of channel estimation of each transmitting or receiving link;

a2. performing a phase equalization to the sequence $m_p$, generating a complex vector of the calibration sequence $\underline{m}_p$, $\underline{m}_P=(\underline{m}_1,\underline{m}_2, \ldots, \underline{m}_p)$, where elements of the sequence $\underline{m}_i=(j)^{i-1}\cdot m_i$, i=1, . . . P, and j is the square root of −1;

a3. expanding $\underline{m}_p$ periodically and obtaining a new periodical complex vector $\underline{m}$, $\underline{m}=(\underline{m}_1,\underline{m}_2, \ldots, \underline{m}_{i_{max}})=(\underline{m}_2, \underline{m}_3, \ldots, \underline{m}_p,\underline{m}_1,\underline{m}_2, \ldots, \underline{m}_p)$;

a4. obtaining a calibration sequence vector with a length Lm=P+w−1 for each antenna element from the periodical complex vector $\underline{m}$, $\underline{m}^{(k)}=(\underline{m}_1^{(k)},\underline{m}_2^{(k)}, \ldots, \underline{m}_{L_m}^{(k)})$, k=1, . . . N, an element of the calibration sequence vector $\underline{m}_i^{(k)=\underline{m}}{}_{i+(N-k)W}$, i=1, . . . Lm and k=1, . . . N; and a5. generating a calibration sequence signal with a fixed power from the calibration sequence vector on the basis of a calibration requirement.

* * * * *